United States Patent [19]
van Essen et al.

[11] Patent Number: 5,168,977
[45] Date of Patent: Dec. 8, 1992

[54] RELEASE MECHANISM

[75] Inventors: Henk van Essen, Terschuur; Telle van der Schoot, Aalten, both of Netherlands

[73] Assignee: FPS Food Processing Systems B.V., Netherlands

[21] Appl. No.: 710,442

[22] Filed: Jun. 5, 1991

[51] Int. Cl.⁵ .............................. B65G 47/46
[52] U.S. Cl. ................... 198/364; 198/365; 209/513; 209/510
[58] Field of Search ............ 198/364, 365, 370, 464.3, 198/479.1, 418.6; 209/510–516, 912

[56] References Cited

U.S. PATENT DOCUMENTS 3,224,579 12/1965 Scollard .
4,569,444 2/1986 McEvoy .
4,776,465 10/1988 McEvoy et al. .................. 209/513

FOREIGN PATENT DOCUMENTS 6706017 10/1968 Netherlands .

Primary Examiner—Joseph E. Valenza
Attorney, Agent, or Firm—Larson and Taylor

[57] ABSTRACT

A method and apparatus for releasing articles from holders mounted on a conveyor travelling at varying speeds, the varying ballistic trajectory of the released articles being automatically compensated for, depending on the speed of the conveyor, by shifting the discharge locations of the article holders. One or more adjacent ones of the releasing members for each delivery station, arranged side by side in the direction of travel of the conveyor, are fixed against movement in the direction of movement of the conveyor.

22 Claims, 3 Drawing Sheets

RELEASE MECHANISM

This invention relates to a method of releasing articles from holders mounted on a conveyor traveling continuously at varying speed, the varying ballistic trajectory of the released articles being automatically compensated depending on the speed of the conveyor by shifting the discharge locations of the article holders.

Such a method is known from U.S. Pat. No. 3,224,579 (Scollard), U.S. Pat. No. 4,569,444 (McEvoy) and from Dutch patent application no. 67.06017 (Mosterd). In these publications the ballistic trajectory compensation is realized by moving the releasing means in the direction of transport of the moving conveyor, in a positive or in a negative sense.

A disadvantage of the known methods is that the adjustments of said compensation in the direction of travel of the conveyor — normally, a plurality of them, for instance twelve or more, are arranged side by side — will be the same at a given speed. In practice, however, this is not always desirable, since the ballistic trajectory of lighter articles will often be different from that involved in the fall of heavier articles.

The object of the invention is to remove the drawback mentioned.

To that effect, a method of the type described in the opening paragraph hereof is characterized in that one or more adjacent ones of the releasing members for each delivery station are fixedly arranged side by side in the direction of travel of the conveyor. These release members may have an operational range extending in the direction of travel exceeding the horizontal component of the longest ballistic trajectory in question.

The invention further relates to an apparatus for carrying out the above described method, the releasing members having release elements whose stop range in the direction of travel of the conveyor may exceed at least the horizontal component of the longest ballistic trajectory in question.

The release elements of the releasing members may be of oblique or bent design and, for opening the article holder, can be brought into the path of the article holder perpendicularly to the direction of travel of the conveyor, in such a way that the location and time of stopping are in agreement with the corresponding speed of the conveyor.

Further, the releasing means may be solenoids or the like and the release elements may be mounted on the movable armature thereof.

The release elements may also be independent elements which can be successively operated by cams mounted on a central shaft operated by a stepping and/or DC voltage motor.

Further, each releasing means may be a stepping motor and the release element may be mounted on the shaft thereof, which depending on the speed of the conveyor rotates through a given angle and thereby determines the stop location of the article holder.

In yet another embodiment, the releasing means are electromagnets which upon excitation act as release elements to pull a magnetizable element of a passing holder, so that the release of the article is realized.

In that embodiment, the number of electromagnets for each delivery station may exceed by at least one the number of receiving positions at each receiving station.

According to a yet further embodiment of the invention, the releasing means consist of solenoids or the like and the release elements are mounted on the movable armature thereof, the number of release elements exceeding by at least one the number of receiving positions for each receiving station. Thus, the releasing members arranged farthest downstream, corresponding to the number of release elements, can be used at lower speeds of transportation, while the releasing members arranged farthest upstream can be used at higher speeds.

In similar manner as described hereabove, the release elements may be independent levers, which are successively operated by cams mounted on a central shaft operated by a stepping motor or the like, while the number of cams exceeds by at least one the number of receiving positions for each receiving station. In such a construction, too, the cams arranged farthest downstream can be used at lower conveyor speeds and the cams arranged farthest upstream at higher conveyor speeds.

To clarify the invention some embodiments of the release mechanism will now be described with reference to the accompanying drawings, in which.

Figure 1:
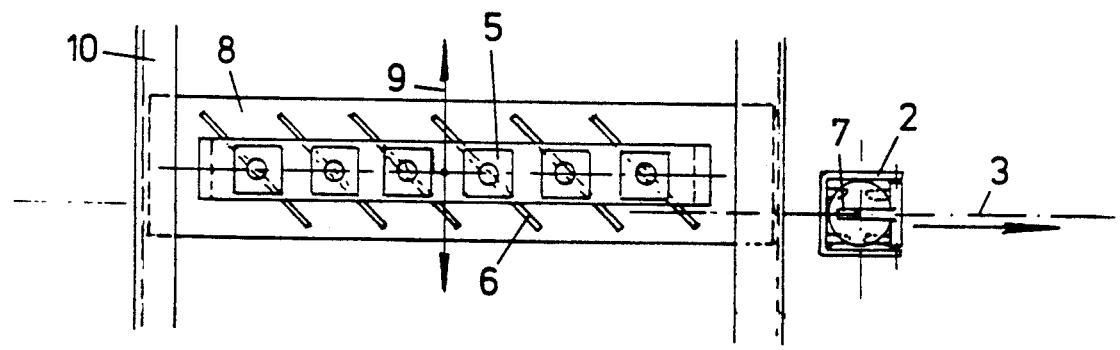
FIG. 1 is a schematic top plan view of a part of a releasing apparatus according to the invention.

According to FIG. 1 a releasing apparatus comprises a conveyor 3 on which article holders 2 are mounted for transporting articles 1. The article holders can be operated by a release mechanism 4. The release mechanism 4 comprises a mounting frame 8 on which a plurality of releasing members 5 (e.g. electromagnets or the like) are arranged, which can be actuated in the required sequential order of release of articles 1. Mounted on the movable armature of each releasing member 5 is a release element 6 which is an elongated element, which can be brought within the path of the release means 7 of the holders 2, so that the holders 2 are opened and the articles are released. By mounting the release element 6 on the armature of the releasing member at an angle with the direction of travel of the conveyor, the stop location between the release element 6 and the release means 7 is shifted when the releasing member 4, depending on the speed of the conveyor 3, is shifted perpendicularly to the direction of travel of the conveyor 3. This shifting can be realized by means of a drive (not shown), which shifts the mounting frame 8 of the releasing members in the direction of the arrow indicated at 9 in guideways 10, which in the present case extend perpendicularly to the direction of travel of the conveyor 3.

Figure 2:
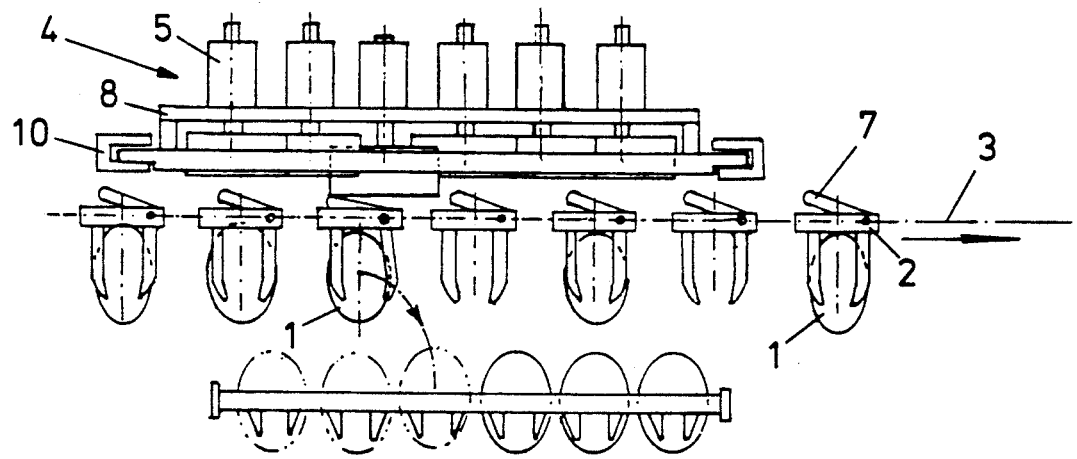
FIG. 2 is a side elevational view of the apparatus according to FIG. 1.

The embodiment according to FIG. 3, of which only the parts that differ from those of the apparatus according to FIGS. 1 and 2 will be discussed, concerns a releasing apparatus in which the armatures of the releasing members 5 are provided with substantially adjacent release elements 11. By delaying or accelerating the actuation of the releasing members depending on the conveyor speed, the moment of impact and hence the release location is shifted. In this embodiment it is also possible that at different speeds of the conveyor 3, different releasing members 5 serve to fill the same receiving position 12 of a receiving station 13. In other words, at a low speed, releasing member 5-1 releases the article from holder 2'-1 through trajectory 14-1, while at a high speed this function is taken over by releasing member 5-2, from holder 2"-2, through trajectory 14-2. In that case, therefore, the number of releasing members must always exceed by one or more the number of receiving positions 12 in receiving station 13.

Figure 4:
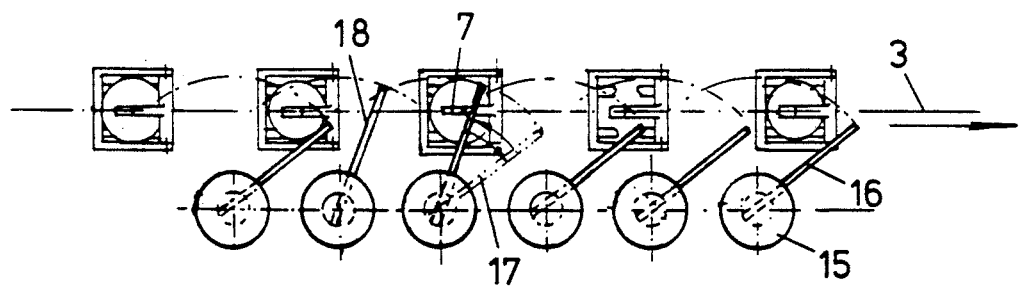
FIG. 4 is an elevation similar to FIG. 1 of a third embodiment of the releasing apparatus according to the invention.

In the third embodiment, shown in FIG. 4, the releasing members consist of rotating magnets or stepping motors 15, on whose shaft are mounted release elements 16 which depending on the speed of the conveyor 3 can rotate from an inoperative position 17 through a specific angle depending on the speed of the conveyor into the proper releasing position 18 which determines the release location for release means 7 of the holder.

Figure 5:
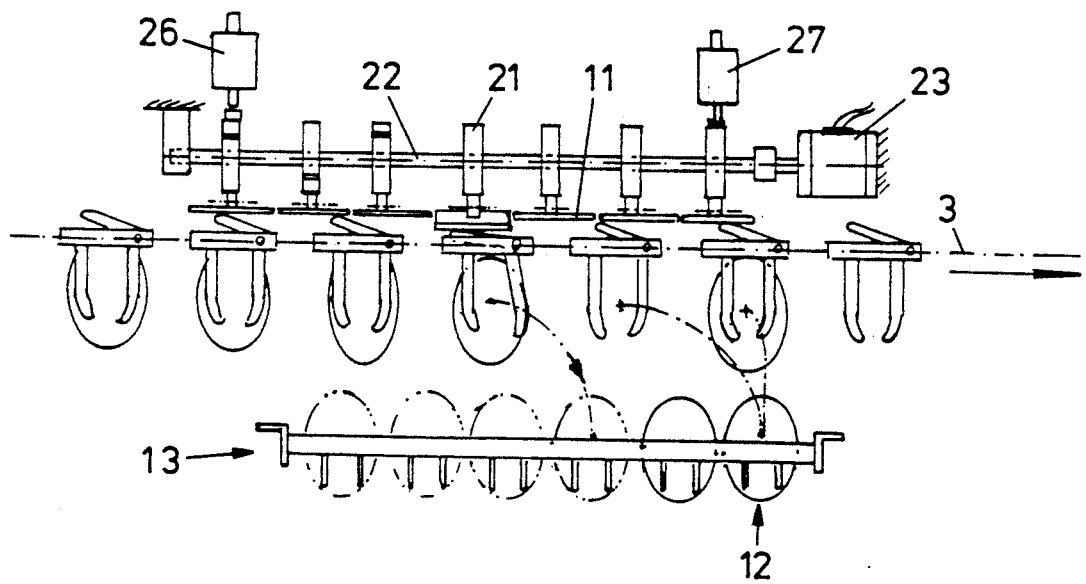
FIG. 5 is an elevation similar to FIGS. 1 and 3 of a fourth embodiment of the apparatus according to the invention.
Figure 6:
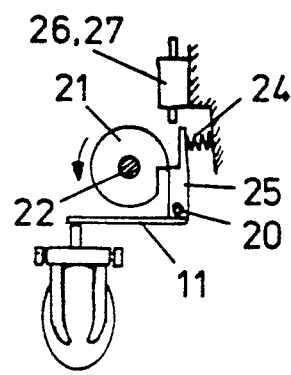
FIG. 6 is a side elevation of the apparatus according to FIG. 5.

FIGS. 5 and 6 schematically show a fourth embodiment of a releasing system, in which release elements 11 are designed as levers (see the side elevation according to FIG. 6), which can rotate about pivots 20 and can successively be operated by cams 21 on shaft 22, driven by a stepping motor 23. A spring 24 provides for quick and forceful release. By decelerating or accelerating the actuation of the stepping motor depending on the conveyor speed, the moment of release and hence the location of release is shifted.

The release elements 11 are arranged virtually adjacent to each other and, in view of different conveyor speeds, can take over from one another the release function in respect of one receiving position, in the same way as discussed hereinabove with reference to the apparatus according to FIG. 3.

Accordingly, there are always mounted on the cam shaft 22 one or more cams than there are receiving positions 12 in the receiving station 13. Thus, at low speed the left-most lever 25 is blocked by means of magnet 26 and at high speeds the right-most lever 25 by means of a magnet 27.

Figure 7:
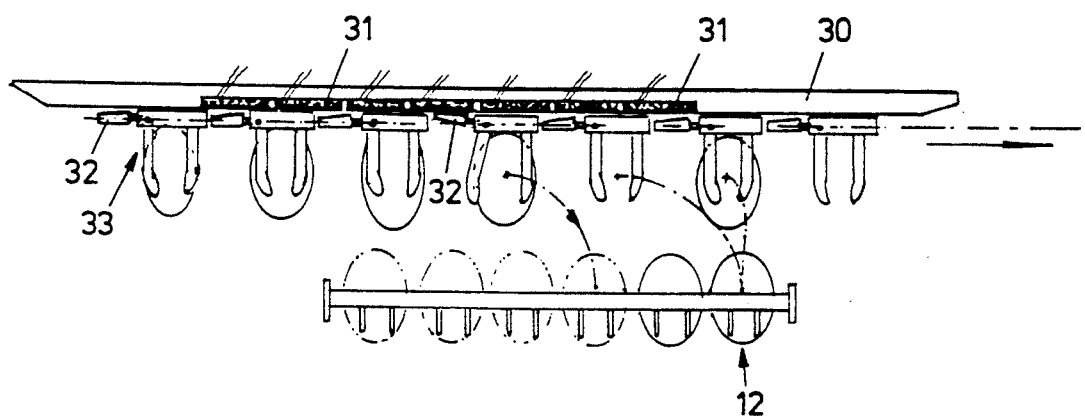
FIG. 7 is an elevation similar to FIGS. 2, 3 and 5 of a fifth embodiment of the apparatus according to the invention.

FIG. 7 shows a fifth embodiment of a releasing apparatus, in which the section 30 mounts a plurality release member in the form of of electromagnets 31, which can be excited in the desired sequential order of release and thereby constitute release elements to attract magnetizable release means 32 of article holder 33, whereby these holders are opened. Here, too, the moment of actuation of the magnets, depending on the conveyor speed, determines the location of release.

Figure 3:
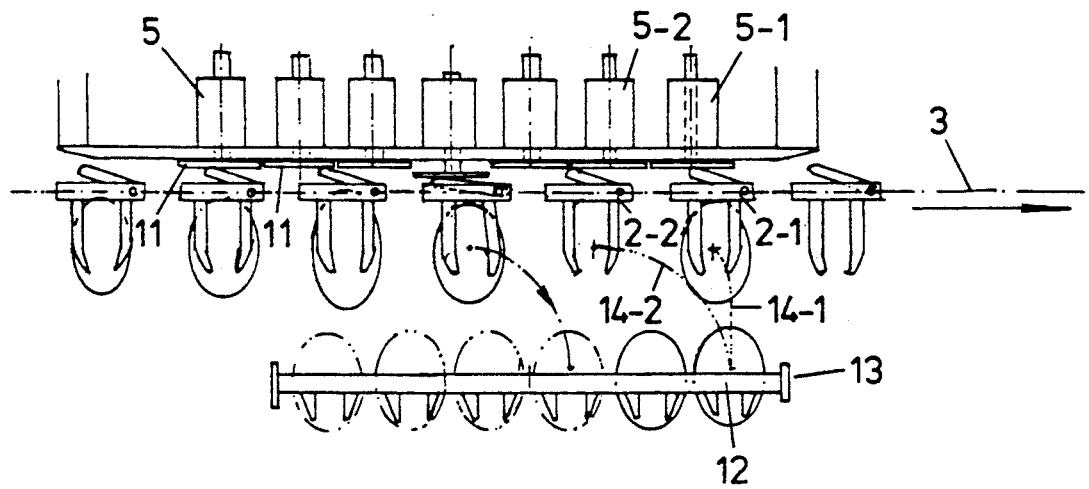
FIG. 3 is an elevation similar to FIG. 2 of a second embodiment of the releasing apparatus according to the invention.

As in the apparatuses according to FIGS. 3 and 5, more than one magnet can take over from each other the release function in respect of one receiving position 12 at different speeds, in other words the number of magnets may exceed the number of receiving positions for each receiving station.

Figure 8:
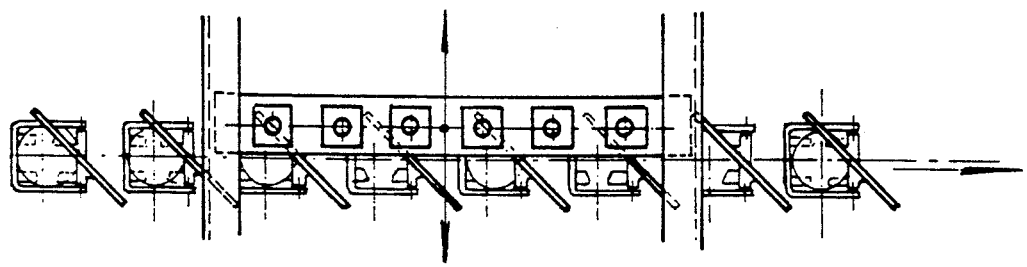
FIG. 8 is an elevation similar to FIGS. 1 and 4 of a sixth embodiment of the apparatus according to the invention.

FIG. 8 shows a sixth embodiment, in which solenoids are used as releasing members in the same manner as in the embodiment according to FIG. 1. In the apparatus according to FIG. 8 the armature of a solenoid or its extension constitutes a release element which is brought into the path of the release means of the article holders for the purpose of discharge. In this embodiment, the release means on the article holder is an elongated element, shaped like the element 6 of FIG. 1. These release means are are in an oblique position relative to the direction of travel of the conveyor and the solenoids can be moved perpendicularly to the direction of travel of the conveyor, which is indicated in FIG. 8 by a double arrow perpendicular to the direction of travel of the holders.

It will be clear that within the framework of the inventive concept further embodiments are conceivable, including the use of a plurality of conveyors 3 arranged side by side for filling a multi-row receiving station 13.

I claim:

1. An apparatus for releasing into a receiving means articles carried by article holders on a conveyor, which conveyor is capable of traveling at varying speeds, comprising:

varying means for varying, in the direction of travel of the conveyor, the position at which each article holder releases its article, relative to the position of the receiving means, thereby compensating for changes in the ballistic trajectory of the released article, which varies in relation to the speed of the conveyor, said varying means comprising release members which are fixed against movement in the direction of travel of the conveyor, each release member having a release element, the actuation of which effects the release of the article from its holder.

2. An apparatus according to claim 1, wherein the range in the direction of travel of the conveyor over which each release element can effect release of the article exceeds the horizontal component of the longest anticipated ballistic trajectory.

3. An apparatus according to claim 1, wherein the release members comprise solenoids, the armatures of which each carry a release element in the form of an arm extending obliquely to the direction of travel of the conveyor, said release members being mounted on a frame perpendicular to the direction of movement of the conveyor, to thereby change the point on the arms at which the arms engage the release means.

4. An apparatus according to claim 3, wherein the range in the direction of travel of the conveyor over which each release element can effect release of the article exceeds the horizontal component of the longest anticipated ballistic trajectory.

5. An apparatus according to claim 1, wherein the release members comprise solenoids, the armatures of which carry the release elements, the number of solenoid release members exceeding the number of articles which the receiving means is capable of holding, taken in a row along the direction of travel of the conveyor.

6. An apparatus according to claim 1, wherein the release members comprise stepping motors, the shafts of which each carry a release element, the position of which is varied angularly upon rotation of its respective stepping motor shaft, the position of which release element determines the position at which the release means are actuated to effect release of an article.

7. An apparatus according to claim 6, wherein the range in the direction of travel of the conveyor over which each release element can effect release of the article exceeds the horizontal component of the longest anticipated ballistic trajectory.

8. An apparatus according to claim 1, wherein the release members each comprise release elements in the form of levers, each pivotable under the action of a cam to actuate release means of the holders, the cams being mounted on a common cam shaft, a stepping motor for turning the cam shaft.

9. An apparatus to claim 8, the number of levers exceeding the number of articles which the receiving means is capable of holding, taken in a row along the direction of travel of the conveyor.

10. An apparatus according to claim 1, wherein the release members comprise electromagnets, the actuation of which causes the electromagnets to constitute release elements to actuate release means in the form of magnetizable elements on the article holders.

11. An apparatus according to claim 10, wherein the number of electromagnets exceeds the number of articles which the release means is capable of holding, taken in a row along the direction of travel of the conveyor.

12. An apparatus according to claim 1, wherein the release members are solenoids, the armatures of which constitute the release elements, the release means of the article holders comprising arms on the article holders which extend obliquely to the direction of travel of the conveyor, said release members being mounted on a frame for horizontal movement perpendicular to the direction of movement of the conveyor, to thereby change the point on the arms which engage the release elements.

13. An apparatus for releasing into a receiving means articles carried by article holders on a conveyor, which conveyor is capable of traveling at varying speeds, comprising:
varying means for varying, in the direction of travel of the conveyor, the position at which each article holder releases its article, relative to the position of the receiving means, thereby compensating for changes in the ballistic trajectory of the released article, which varies in relation to the speed of the conveyor,
said varying members comprising release members, the actuation of which effects the release of the article from its holder, which release members are entirely fixed against any movement in the direction of travel of the conveyor.

14. An apparatus according to claim 13, wherein the release members include solenoids, the armatures of which move vertically, perpendicular to the direction of movement of the conveyor.

15. An apparatus according to claim 13, wherein the release members comprise leavers operated by cams, wherein the levers and cams which move in planes perpendicular to the direction of travel of the conveyor.

16. An apparatus according to claim 13, wherein the release members comprise electromagnets, the actuation of which actuates magnetizable release means on the article holders.

17. A method of releasing into a receiving means articles carried by article holders on a conveyor which is capable of travelling continuously at varying speeds, comprising the steps of:
compensating for the change in the ballistic trajectory of the released article, which trajectory varies in relation to the speed of the conveyor, by varying the point at which the article is released from the conveyor, relative to the position of the release means,
said compensating step comprising operating release members which are fixed against movement in the direction of travel of the conveyor, such that actuation of release elements of such release members varies the article release position in the direction of travel of the conveyor.

18. A method according to claim 17, wherein the compensating step has an operational range in the direction of travel of the conveyor which exceeds the horizontal component of the longest ballistic trajectory.

19. A method according to claim 17, wherein the compensating step comprises utilizing a number of separate release members which exceeds the number of articles which the receiving means is capable of holding, taken in a row, in the direction of travel of the conveyor.

20. An apparatus according to claim 1, wherein a plurality of said release members are arranged in the direction of travel of the conveyor, each release member being electrically actuable so as to cause its release element to release an article holder, and wherein the ballistic trajectory of the released article is dependent upon the moment of actuation of a respective release member.

21. An apparatus according to claim 20, wherein the electrically actuable release members comprise solenoids, the armatures of which carry the release elements, the number of solenoid release members exceeding the number of articles which the receiving means is capable of holding, taken in a row along the direction of travel of the conveyor.

22. An apparatus according to claim 20, wherein the electrically actuable release members comprise electromagnets, the actuation of which causes the electromagnets to constitute release elements to actuate release means in the form of magnetizable elements on the article holders.

* * * * *